United States Patent
Mori et al.

(10) Patent No.: US 7,188,648 B2
(45) Date of Patent: Mar. 13, 2007

(54) TIRE/WHEEL ASSEMBLY AND RUN-FLAT SUPPORT MEMBER

(75) Inventors: Shinichi Mori, Hiratsuka (JP); Mitsuo Kurebayashi, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 111 days.

(21) Appl. No.: 10/515,326

(22) PCT Filed: Aug. 19, 2003

(86) PCT No.: PCT/JP03/10441

§ 371 (c)(1),
(2), (4) Date: Nov. 23, 2004

(87) PCT Pub. No.: WO2004/020227

PCT Pub. Date: Mar. 11, 2004

(65) Prior Publication Data

US 2005/0199326 A1    Sep. 15, 2005

(30) Foreign Application Priority Data

Aug. 30, 2002    (JP) ............... 2002-252976

(51) Int. Cl.
*B60C 5/00* (2006.01)
(52) U.S. Cl. ............... 152/156; 152/158; 152/520
(58) Field of Classification Search ........... 152/156, 152/158, 520
See application file for complete search history.

(56) References Cited

U.S. PATENT DOCUMENTS 6,463,974 B1 * 10/2002 Hellweg et al. .......... 15/520 X
6,463,976 B1 * 10/2002 Glinz et al. ................. 152/520
6,843,289 B2 * 1/2005 Shimura et al. ............ 152/156
6,901,980 B2 * 6/2005 Iida et al. ................... 152/156

FOREIGN PATENT DOCUMENTS

| DE | 10208613 C1 | 2/2002 |
| JP | 09-156308 A1 | 6/1997 |
| JP | 10-297226 A1 | 11/1998 |
| JP | 2001-519279 A1 | 10/2001 |
| JP | 2003-136924 A1 | 5/2003 |
| WO | WO-99/64260 A1 | 12/1999 |

OTHER PUBLICATIONS

International Search Report for PCT/JP03/10441 mailed on Nov. 25, 2003.

* cited by examiner

*Primary Examiner*—Adrienne C. Johnstone
(74) *Attorney, Agent, or Firm*—Rader, Fishman & Grauer PLLC

(57) ABSTRACT

A tire/wheel assembly comprising a wheel having a rim, a pneumatic tire fitted to the rim and a run-flat support member. The pneumatic tire includes a cavity, and the run-flat support member is disposed in the cavity of the pneumatic tire. The run-flat support member includes an annular shell and elastic rings. The annular shell has a support surface located radially outward and two leg portions formed radially inward. The elastic rings support the leg portions on the rim. The leg portions of the annular shell are detachably attached to the elastic rings.

8 Claims, 3 Drawing Sheets

TIRE/WHEEL ASSEMBLY AND RUN-FLAT SUPPORT MEMBER

TECHNICAL FIELD

The present invention relates to tire/wheel assemblies and run-flat support members, and more particularly, to a tire/wheel assembly and a run-flat support member used therefor, in which the run-flat support member can be repaired, and manufacturing efficiency thereof can be improved.

TECHNICAL BACKGROUND

In response to demands in the market, there have been proposed many technologies which allow a vehicle to urgently travel when a pneumatic tire thereof is punctured during traveling. These many proposals include such a technology disclosed in Japanese Patent Laid-Open Publication No. 10-297226 and Published Japanese Translation of a PCT Application No. 2001-519279 that a support member is fitted onto a rim in the cavity of a pneumatic tire which is assembled to the rim, and supports the tire when punctured to thereby enable run-flat traveling.

The above run-flat support member comprises an annular shell having a support surface located radially outward and two leg portions formed radially inward, and elastic rings attached thereto, and is supported on the rim via the elastic rings. The run-flat support member allows existing wheels and rims to be used without any specific modification, and can therefore be advantageously adopted without causing confusions in the market.

In general, the annular shell of the above-mentioned run-flat member is attached to the elastic rings thereof by bonding to the elastic rings the leg portions of the annular shell which are embedded therein when the elastic rings are formed by heating, and the annular shell and the elastic rings are unitarily structured so that they are not detachable. Therefore, in the case where either the annular shell or the elastic ring is damaged into an unusable state by run-flat traveling at 0 pressure after the tire is punctured, a problem arises such that a new run-flat support member must be purchased even if the other is still usable.

Also, wheels to mount a tire having the same size have different rim shapes, and the same sized tires have different shapes of the inner faces of the tire beads with which the elastic rings come into contact, whereby respective run-flat support members having an annular shell and elastic rings corresponding thereto need to be manufactured. Various types of run-flat support members, therefore, have to be manufactured, and there is a problem of very low manufacturing efficiency.

DISCLOSURE OF THE INVENTION

An object of the present invention is to provide a tire/wheel assembly and a run-flat support member, in which the run-flat support member can be repaired by replacement of a damaged annular shell or elastic ring, and the manufacturing efficiency of the run-flat support member can be improved.

In order to achieve the above object, a tire/wheel assembly according to the present invention comprises:
a wheel having a rim;
a pneumatic tire fitted to the rim of the wheel, the pneumatic tire having a cavity; and
a run-flat support member disposed in the cavity of the pneumatic tire, the run-flat support member having an annular shell and elastic rings, the annular shell comprising a support surface located radially outward and two leg portions formed radially inward, the elastic rings supporting the leg portions on the rim,
wherein the leg portions of the annular shell are detachably attached to the elastic rings.

A run-flat support member according to the present invention comprises:
an annular shell having a support surface located radially outward and two leg portions formed radially inward; and
elastic rings supporting the leg portions on a rim,
wherein the leg portions of the annular shell are detachably attached to the elastic rings.

As mentioned above, the leg portions of the annular shell is detachably attached to the elastic rings, and therefore, in the case where either the annular shell or the elastic ring is damaged into an unusable state, it can be removed to replace it. Accordingly, the run-flat support member can be repaired.

Respective annular shells and elastic rings matching such conditions as rim shapes are manufactured, and when used (sold), a run-flat support member can be fabricated by assembling the annular shell and elastic rings. Therefore, it is not necessary to conventionally manufacture various types of run-flat support members having a unitary structure of an annular shell and elastic rings, thus allowing manufacturing efficiency to be improved.

BEST MODES FOR CARRYING OUT THE INVENTION

Figure 1:
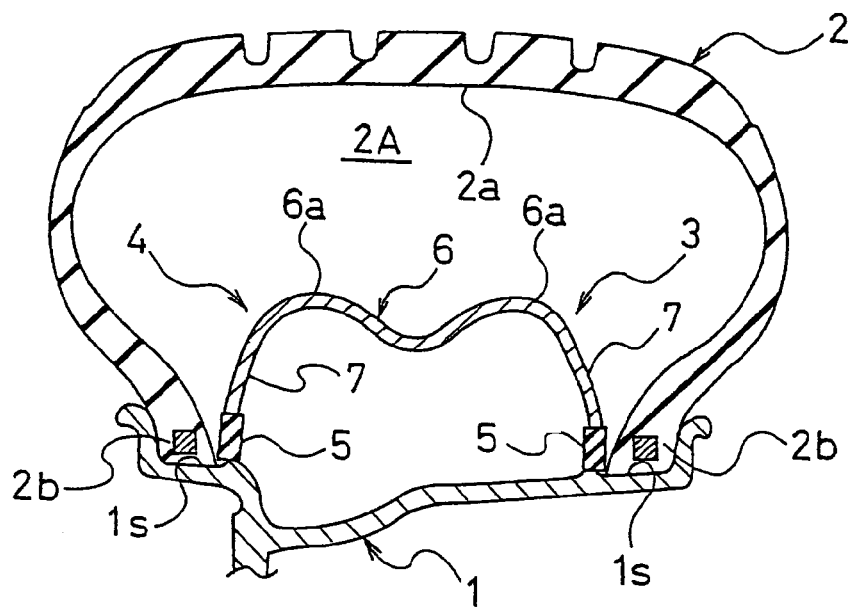
FIG. 1 is a meridian cross-sectional view showing a main part of a tire/wheel assembly according to an embodiment of the present invention.

According to the present invention, a run-flat support member is formed as an annular member to be inserted into the cavity of a pneumatic tire. This run-flat member is formed to have an outer diameter smaller than the inner diameter of the cavity of a pneumatic tire so as to maintain a constant distance from the inner surface of the cavity, and is formed to have an inner diameter which is approximately equal in size to the inner diameter of the beads of a pneumatic tire. The run-flat support member is inserted into a pneumatic tire, and assembled to the rim of a wheel together with the pneumatic tire to thereby form a tire/wheel assembly. The tire/wheel assembly is attached to a vehicle, and when the pneumatic tire is punctured during traveling, the punctured tire is supported by the radially outer surface of the run-flat support member to thereby allow run-flat traveling.

The above-mentioned run-flat support member includes an annular sell and elastic rings as main parts.

The annular shell is formed to have a continuous support surface for supporting a punctured tire on the radially outer side thereof, and is shaped to have two leg portions which consist of left and right sidewalls in a straddled state on the radially inner side thereof. The radially outer side support surface is formed such that the cross-sectional shape taken along a plane orthogonal to the circumferential direction thereof has radially outwardly convexed and curved surface sections. The number of the convexly curved surface sections which are aligned in an axial direction of the tire may be one, but preferably, two or more. Formation of the support surface in such a way as to align two or more convexly curved surface sections provides the support surface with two or more dispersed contact points with respect to the inner surface of the tire to thereby reduce localized wear on the tire inner surface, and therefore, a run-flat traveling distance can be extended.

The elastic rings are attached to the ends of the two leg portions formed in the radially inner side of the annular shell, respectively, and come into engagement with left and right rim seats to thereby support the annular shell. The elastic rings are formed of rubber or elastic resin, and not only mitigate the vibration and impact of the annular shell receiving from a punctured tire, but also prevent slipping with respect to the rim seats to thereby stably support the annular shell.

The annular shell is formed of a rigid material due to the fact that the run-flat support member has to support a vehicle weight through a punctured tire. The constituent materials thereof include metal, resin and the like. The metal materials may include, for example, steel and aluminum. The resins may be thermoplastic resins or thermosetting resins. The thermoplastic resins may include nylon, polyester and the like, and the thermosetting resins may include epoxy resins, unsaturated polyester resins, etc. The resins may be used alone or mixed with reinforcing fibers as fiber-reinforced resins.

The elastic rings may be formed of any kind of rubber or elastic rein if the annular shell can stably be supported, and the rubber materials may include, for example, natural rubber, isoprene rubber, styrene-butadiene rubber, butadiene rubber, butyl rubber.

The run-flat support member used for the tire/wheel assembly of the present invention is premised on the structure described above.

The embodiments of the present invention will be described in detail below with reference to the drawings.

FIG. 1 is a meridian cross-sectional view illustrating a main part of a tire/wheel assembly according to an embodiment of the present invention, in which reference numeral 1 denotes a rim in the outer periphery of a wheel, reference numeral 2 denotes a pneumatic tire, and reference numeral 3 denotes a run-flat support member. The rim 1, pneumatic tire 2, and run-flat support member 3 are in coaxial alignment with each other around the axis (not shown) of rotation of the wheel to be in the form of an annulus, which has an arrangement such that the run-flat support member 3 is placed in the cavity 2A of the pneumatic tire 2 mounted on the rim 1.

The run-flat support member 3 comprises an annular shell 4 formed of a rigid material such as metal or rein, and left and right elastic rings 5 formed of an elastic material such as rubber or elastic resin.

The annular shell 4 has a support surface 6 formed on the radially outer side thereof, which consists of two convexly curved surface sections 6a with a radius of curvature aligned in the shell width direction, and the support surface 6 is spaced apart from the inner surface 2a of the pneumatic tire 2 when the pneumatic tire 2 is under a normal condition, and when punctured, the support surface 6 supports the punctured tire. The annular shell 4 also has two side walls formed as leg portions 7 on the radially inner side thereof, and the elastic rings 5 are detachably attached to the radially inner sides of the leg portions 7.

The attachment constructions of the leg portions 7 to the elastic rings 5 shown in, for example, FIGS. 2 to 7 may be employed.

Figure 2:
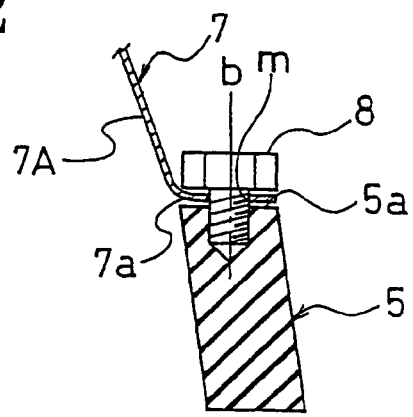
FIG. 2 is an enlarged cross-sectional view showing an example of an attachment construction of the leg portion of the annular shell to the elastic ring.

Referring to FIG. 2, the leg portion 7 formed in an L-shaped cross section is releasably fixed at an attachment section 7a thereof by bolts 8 to the radially outer surface 5a of the elastic ring 5 which is in the shape of a parallelogram in cross section. The attachment section 7a is formed in a ring shape having a width extending in a direction of the rotation axis of the wheel, and has insert-through holes m for inserting the bolts 8 therethrough in a predetermined interval along its circumferential direction. The attachment section 7a is directly fixed to the radially outer surface 5a of the elastic ring 5 which is parallel to the wheel rotation axis by the bolts 8 each having a bolt axis b which extends in a radius direction of the wheel perpendicular to the wheel rotation axis.

Each bolt 8 may be directly screwed into without any fabrication in the radially outer surface 5a of the elastic ring 5, or may be screwed into a preformed hole for indicating a fixed position of the bolt, the diameter of which is smaller than that of the bolt. Alternatively, the bolts 8 may be threaded into threaded screw holes which are formed in the radially outer surface 5a of the elastic ring 5 in such a manner that the bolts can be threadedly engaged.

Figure 3:
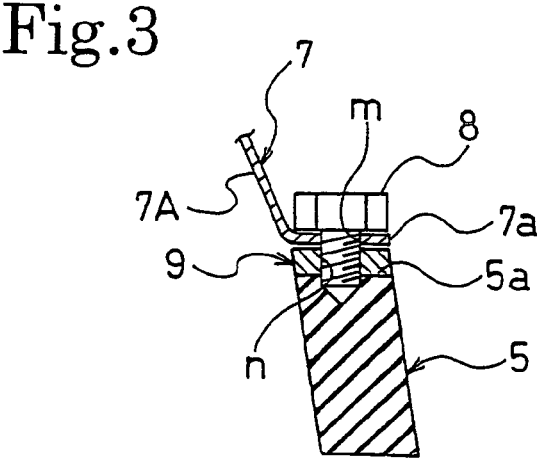
FIG. 3 is an enlarged cross-sectional view showing an alternative example of an attachment construction of the leg portion of the annular shell to the elastic ring.

Referring to FIG. 3, a ring-shaped fixing component 9, formed of metal or synthetic rein, for threading the bolts 8 is disposed on the radially outer surface 5a of the elastic ring 5 which is in the shape of a parallelogram in cross section. The fixing component 9 is integrally attached to the elastic ring 5 by integral bonding of the fixing component to the elastic ring during formation of the elastic ring. Formed through the fixing component 9 in a predetermined interval along its circumferential direction are threaded screw holes n into which the bolts 8 can be threaded.

The attachment section 7a of the leg portion 7 is releasably fixed to the elastic ring 5 by the bolts 8 which are threaded into the threaded screw holes n through insert-through holes m formed in the attachment section 7a of the leg portion 7. Provision of the fixing component 9 on the elastic ring 5 described above allows the annular shell 4 to be more firmly fixed to the elastic rings 5 than in the case of FIG. 2.

In the alternative of the above-mentioned ring-shaped component, the fixing component 9 may be composed of a plurality of plate pieces which are integrally bonded to the radially outer surface 5a at respective locations corresponding to the fixing positions.

Figure 4:
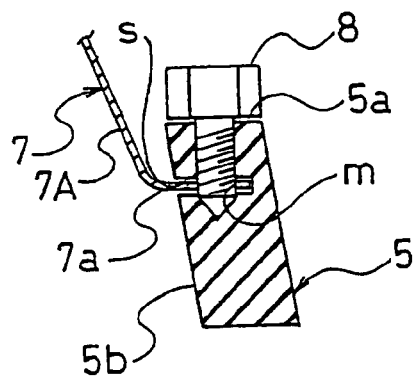
FIG. 4 is an enlarged cross-sectional view showing another alternative example of an attachment construction of the leg portion of the annular shell to the elastic ring.

Referring to FIG. 4, the elastic ring 5 which is in the shape of a parallelogram in cross section has an insert slot s, circularly extending along a circumferential direction of the ring, in an inner surface 5b thereof for inserting the attachment section 7a of the leg portion 7 extending in a direction of the wheel rotation axis. The leg portion 7 is fixed to the elastic ring 5 by the bolts 8, which are threaded into the elastic ring 5 from the radially outer surface 5a of the elastic ring 5 and inserted through the insert-through holes m of the attachment section 7a put into the insert slot s.

Figure 5:
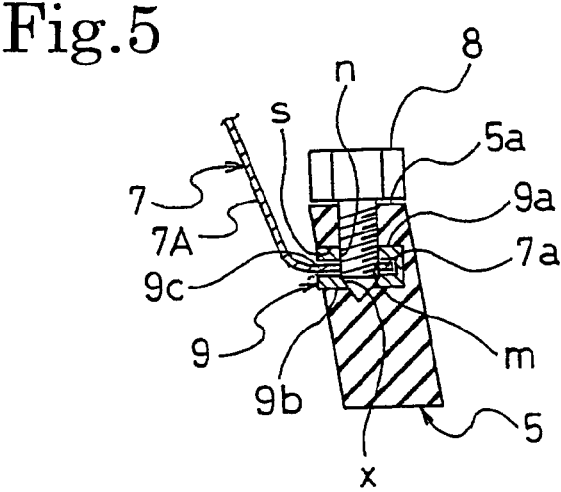
FIG. 5 is an enlarged cross-sectional view showing still another alternative example of an attachment construction of the leg portion of the annular shell to the elastic ring.

Referring to FIG. 5, in the construction of FIG. 4, the insert slot s is wider in width, and the fixing component 9 is attached into the insert slot s by integral bonding during formation of the elastic ring. The fixing component 9 includes a radially outer ring portion 9a, a radially inner portion 9b, and a ring-shaped slot 9c formed between the radially outer ring portion 9a and the radially inner portion 9b, and the radially outer ring portion 9a has threaded screw holes n for threading the bolts 8 which are formed therethrough in a predetermined interval along the ring circumferential direction. The radially inner portion 9b has insert-through holes x formed at locations corresponding to the above threaded screw holes n in a predetermined interval along the ring circumferential direction.

The attachment section 7a of the leg portion 7 is put into the ring-shaped slot 9c, and the leg portion 7 is fixed to the elastic ring 5 by the bolts 8, which are threaded into the elastic ring 5 from the radially outer surface 5a of the elastic ring 5 to thread the bolts 8 into the threaded screw holes n, and are inserted through the insert-through holes m of the attachment section 7a and the insert-through holes x of the radially inner ring portion 9b.

Figure 6:
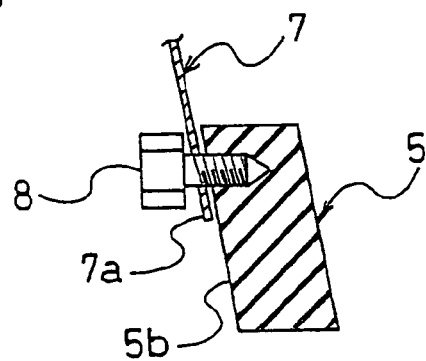
FIG. 6 is an enlarged cross-sectional view showing still another alternative example of an attachment construction of the leg portion of the annular shell to the elastic ring.

Referring to FIG. 6, the attachment section 7a of the leg portion 7 is not bent in an L shape in cross section, but has a shape which extends along the inner surface 5b of the elastic ring 5, and the attachment section 7a is releasably fixed to the inner surface 5b of the elastic ring 5 by the bolts 8.

Figure 7:
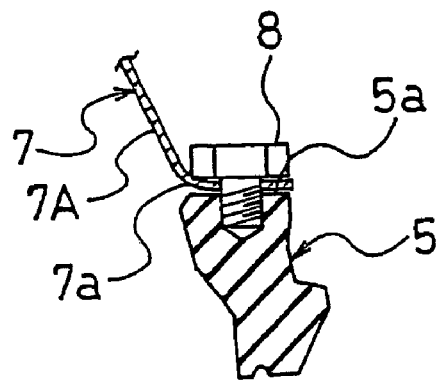
FIG. 7 is an enlarged cross-sectional view showing an example of an attachment construction of the leg portion of the annular shell to an elastic ring having a shape fitting to the rim having a different shape.

Referring to FIG. 7, an example is shown of the case where the leg portion 7 of the annular shell 4 is coupled to the elastic ring 5 having a shape fitting to the rim or the like having a different shape, and as in FIG. 2, the attachment section 7a of the leg portion 7 is directly releasably fixed to the radially outer surface 5a of the elastic ring 5 by the bolts 8. The elastic ring has a shape corresponding to the hump shape of a fitting rim and to the inner shape of the bead of a fitting tire.

The run-flat support member 3 constructed as described above is inserted into the pneumatic tire 2 when assembled to the rim, and the elastic rings 5 are then fitted onto the rim seats 1s of the rim 1 together with the beads 2b of the pneumatic tire 2 simultaneously.

According to the present invention mentioned above, the leg portions 7 of the annular shell 4 is detachably attached to the elastic rings 5, and therefore, in the case where either the annular shell 4 or the elastic ring 5 is damaged into an unusable state, it can be removed to replace it. Thus, the run-flat support member 3 can be repaired.

Respective annular shells 4 and elastic rings 5 matching such conditions as rim shapes are prepared, and when used (sold), a run-flat support member can be fabricated by assembling the annular shell and elastic rings. Therefore, it is not necessary to conventionally manufacture various types of run-flat support members having a unitary structure of an annular shell and elastic rings, thus allowing manufacturing efficiency to be improved.

Figure 8:
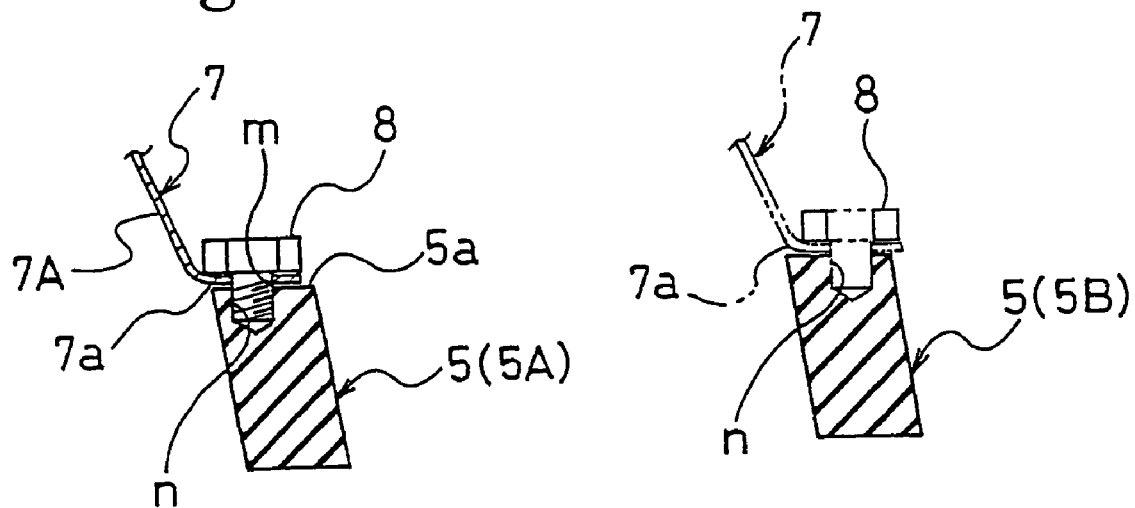
FIG. 8 is an enlarged cross-sectional view showing an example of the run-flat support member that enables a position of the elastic ring to be fine adjusted.

FIG. 8 shows an example of the run-flat support member 3 that allows a position of the elastic ring 5 to be fine adjusted. Prepared are a plurality of (two in the drawing) elastic rings 5A and 5B having threaded screw holes n for threading the bolts 8 in the radially outer surface 5a, the threaded screw holes n of the respective elastic rings being displaced in a direction of the wheel rotation axis, and the leg portion 7 of the annular shell is fixed to one properly selected from the plurality of the elastic rings 5A and 5B by the bolts 8 as in FIG. 2. This allows a fine adjustment of a distance between the left and right elastic rings 5 in correspondence with a tire/wheel assembly to which the elastic rings are to be fitted, using the same annular shell 4.

In the present invention, the foregoing bolts 8 may be formed of metal or synthetic resin. The metal materials may include, for example, steel and aluminum. The synthetic resins may be thermoplastic resins or thermosetting resins. The thermoplastic resins may include, for example, nylon and polyester, and the thermosetting resins may include, for example, epoxy resins and unsaturated polyester resins.

As shown in FIGS. 2 to 5, 7 and 8, in the case where the attachment section 7a of the leg portion 7 extending in the wheel rotation axis direction is fixed to the elastic ring 5 by the bolts 8 which have a bolt axis b (see FIG. 2) extending in a radial direction of the wheel, the bolts 8 are preferably formed of synthetic resin in terms of weight saving since a great shearing force (a force acting in a direction orthogonal to the bolt axis b) is not applied to the bolts 8 by the fixed attachment section 7a. The bolts 8 are preferably formed of metal in the case of the example shown in FIG. 6.

The metals and synthetic resins used for the fixing component 9 may be the same as those of the bolts 8. The metal materials may include steel, aluminum and the like, the thermoplastic resins may include nylon, polyester, etc., and the thermosetting resins may include epoxy resins, unsaturated polyester resins and so on.

The attachment section 7a of the leg portion 7 extends from the leg body section 7A thereof towards the outer side of the width direction of the run-flat support member 3 in the above embodiments (except FIG. 6), but may be arranged so as to extend inwardly from the outer side of the width direction.

The attachment sections 7a of the left and right portions 7 may be symmetrical or asymmetrical in shape with respect to the center line of the annular shell. In the case of shaping asymmetrically, for example, the leg portion 7 on the outer side of a vehicle when attached thereto is bent axially inwardly (inwardly in a width direction of the run-flat support member 3) to form the attachment section 7a, while the leg portion 7 on the inner side of a vehicle when attached thereto is axially outwardly bent to form the attachment portion 7a, as shown in FIGS. 2 to 5, 7 and 8. In this case, the annular shell is attached to be offset towards the outer side of a vehicle to which a greater load is applied, thus improving durability. The leg portions 7 may also be formed, for example, to have different tilt angles.

The foregoing embodiments exemplify the cases where the support surface 6 of the annular shell 4 has two convexly curved surface sections 6a and 6a. However, the number of the convexly curved surface sections is not limited to two, but may be one, or three or more.

The attachment of the annular shell 4 to the elastic rings 5 is preferably performed by the bolts 8, as described above, since the annular shell 4 can strongly be fixed to the elastic rings 5. However, other fixing members may be employed to fix it.

As illustrated above, according to the present invention, the annular shell is detachably attached at the leg portions thereof to the elastic rings, and therefore, the annular shell or the elastic ring can be replaced when broken to thereby repair the run-flat support member, as well as the manufacturing efficiency of the run-flat support members can be improved.

INDUSTRIAL APPLICABILITY

The present invention having the aforementioned excellent effects is very effectively applicable to a tire/wheel assembly which is to be attached to a vehicle and allows run-flat traveling, and to a run-flat support member used therefor.

What is claimed is:

1. A run-flat support member comprising: an annular shell having a support surface located radially outward and two leg portions formed radially inward;
   elastic rings supporting the leg portions on a rim; and
   a plurality of elastic rings having threaded screw holes for threading the bolts, the threaded screw holes of the respective elastic rings being displaced in a direction of a rotation axis of a wheel, each of the leg portions of the annular shell being fixed to one selected from the plurality of the elastic rings,
   wherein the leg portions of the annular shell are detachably attached to the elastic rings, and
   wherein the leg portions are releasably fixed to the elastic rings by bolts.

2. A run-flat support member according to claim 1, wherein the elastic rings have a fixing component for threading the bolts, the fixing component being formed of metal or synthetic resin.

3. A run-flat support member according to claim 1, wherein each of the leg portions has an attachment section which extends in a direction of a rotation axis of a wheel, the attachment section being fixed to the elastic ring by the bolts having a bolt axis extending in a radial direction of the wheel.

4. A run-flat support member according to claim 3, wherein the bolts are formed of synthetic resin.

5. A tire/wheel assembly comprising:
   a wheel having a rim;
   a pneumatic tire fitted to the rim of the wheel, the pneumatic tire having a cavity; and
   a run-flat support member disposed in the cavity of the pneumatic tire, the run-flat support member having an annular shell and elastic rings, the annular shell comprising a support surface located radially outward and two leg portions formed radially inward, the elastic rings supporting the leg portions on the rim; and
   a plurality of elastic rings having threaded screw holes for threading the bolts, the threaded screw holes of the respective elastic rings being displaced in a direction of a rotation axis of the wheel, each of the leg portions of the annular shell being fixed to one selected from the plurality of the elastic rings,
   wherein the leg portions of the annular shell are detachably attached to the elastic rings,
   wherein the leg portions are releasably fixed to the elastic rings by bolts.

6. A tire/wheel assembly according to claim 5, wherein the elastic rings have a fixing component for threading the bolts, the fixing component being formed of metal or synthetic resin.

7. A tire/wheel assembly according to claim 5, wherein each of the leg portions has an attachment section which extends in a direction of a rotation axis of the wheel, the attachment section being fixed to the elastic ring by the bolts having a bolt axis extending in a radial direction of the wheel.

8. A tire/wheel assembly according to claim 7, wherein the bolts are formed of synthetic resin.

* * * * *